United States Patent
Kordesch et al.

(10) Patent No.: US 7,128,990 B2
(45) Date of Patent: Oct. 31, 2006

(54) ADDITIVES TO THE GAS SUPPLY OF FUEL CELLS WITH CIRCULATING ELECTROLYTES AND MEANS TO REGENERATE USED STACKS

(75) Inventors: Karl Kordesch, Graz (AT); Martin Cifrain, Graz (AT)

(73) Assignee: Apollo Energy Systems, Inc., Fort Lauderdale, FL (US)

( * ) Notice: Subject to any disclaimer, the term of this patent is extended or adjusted under 35 U.S.C. 154(b) by 314 days.

(21) Appl. No.: 10/350,334

(22) Filed: Jan. 24, 2003

(65) Prior Publication Data
US 2003/0175581 A1 Sep. 18, 2003

Related U.S. Application Data

(63) Continuation of application No. PCT/US01/41385, filed on Jul. 25, 2001.

(60) Provisional application No. 60/221,228, filed on Jul. 25, 2000.

(51) Int. Cl.
*H01M 8/04* (2006.01)
*H01M 8/18* (2006.01)

(52) U.S. Cl. .................................. 429/19; 429/14
(58) Field of Classification Search ............ 429/19, 429/39, 14
See application file for complete search history.

(56) References Cited

U.S. PATENT DOCUMENTS

| | | | | |
|---|---|---|---|---|
| 4,457,986 A | * | 7/1984 | Bindra et al. ............ | 429/40 |
| 5,108,849 A | * | 4/1992 | Watkins et al. .......... | 429/30 |
| 5,532,071 A | * | 7/1996 | Pal et al. ................. | 429/12 |
| 5,599,638 A | * | 2/1997 | Surampudi et al. ....... | 429/33 |
| 6,045,933 A | * | 4/2000 | Okamoto ................. | 429/17 |

FOREIGN PATENT DOCUMENTS

WO  WO 2001/00524  *  1/2001

* cited by examiner

*Primary Examiner*—Mark Ruthkosky
(74) *Attorney, Agent, or Firm*—Pillsbury Winthrop Shaw Pittman LLP

(57) ABSTRACT

In a gas diffusion electrode the electrolyte must penetrate the pares of the electrode structure to a certain extent to establish the optimum interface between gas and liquid electrolyte, but it should not reach the gas-side of the electrodes. The best equilibrium of the so-called three phase zone (porous current collector-reaction gas-liquid electrolyte) is achieved by adequate wetproofing the porous structure with a polymeric substance as repellency agent. The polymeric substance serves also as a binder. During operation of the electrodes, the wetproofing material may lose its hydrophobicity for various reasons and the result is a penetration into the pores structures, reducing the interface between liquid and gas, notice by a loss of performance. By adding small amounts of wetproofing agents to the gases supplied to the electrodes, the original three-phase condition is maintained, or, if it is already partially degenerated, means and methods for its re-establishment are described. The invention claims substances and techniques for such maintenance and regeneration processes.

17 Claims, 4 Drawing Sheets

ADDITIVES TO THE GAS SUPPLY OF FUEL CELLS WITH CIRCULATING ELECTROLYTES AND MEANS TO REGENERATE USED STACKS

This is a Continuation of International Application No. PCT/US01/41385, which was filed on Jul. 25, 2001, and claims the benefit of U.S. Provisional Application No. 60/221,228, which was filed on Jul. 25, 2000, the contents of both of which are incorporated by reference in their entirety.

BACKGROUND OF THE INVENTION

1. Field of the Invention

The invention relates to the operation of liquid electrolyte fuel cells which use repellancy agents to keep the pores of the gas diffusion electrodes free of electrolyte for the gas access and at the same time provide a large interface for the electrochemical reaction responsible for the production of electricity in the fuel cell.

2. Description of Releated Art

Electrochemical cells invariably comprise at their fundamental level a solid or liquid electrolyte and two electrodes, the anode and cathode, at which the desired electrochemical reactions take place. Porous metal or carbon electrodes are employed in many different electrochemical devices, including metal-air batteries, electrochemical gas sensors, electrosynthesis of useful chemical compounds, and in particular, fuel cells.

A fuel cell is an energy conversion device that efficiently converts the stored chemical energy of its fuel into electrical energy by combining either hydrogen, stored as a gas, or methanol stored as a liquid or gas, with oxygen to generate electrical power. The fuel (e.g. hydrogen) is oxidized at the anode and oxygen (or air) is reduced at the cathode. Both electrodes are of the porous type. The electrolyte has to be in contact with both electrodes and may be acidic or alkaline, liquid, solid or a membrane. The electrodes are designed to be porous and allow the reactant to enter the electrode from the face of the electrode exposed to the reactant fuel supply, and diffuse through the thickness of the electrode to the reaction sites which contain catalysts, usually platinum metal based, to maximize the electrochemical oxidation of hydrogen. The anode is designed be surface-wetted by the electrolyte to contact the same reaction sites. With alkaline electrolyte types the product of the hydrogen reaction is water. The water transpires through the porous electrode into the gas space behind the anode. The cathode is also designed to be porous and allow oxygen or air to enter the electrode and diffuse through to the reaction sites. Catalysts are again commonly incorporated to maximize the rate of the oxygen reaction (peroxide-mechanism) at the cathode reaction sites.

The porous electrodes of fuel cells comprise many components and are typically made up of one or more layers. Typically the gas diffusion electrode will comprise one or more catalyst containing layers, which are supported onto a more rigid porous substrate layer. The catalyst containing layers enhance the desired electrode reactions and comprise a catalyst, which may be formed on a high surface carbon material. Catalysts are often precious metals, particularly platinum alloys in a very high surface area form, dispersed and supported on a high surface area electrically conducting porous carbon, black or graphite. The catalyst component may also be a non precious metal, such as one of the transition metals. In fuel cells which employ alkaline electrolytes, the cathode gas diffusion electrode can comprise catalysts based on macrocyclic compounds of cobalt. The catalyst layers may also comprise a high surface area carbon (steam- or $CO_2$-activated) itself, with no additional metal catalysts. The catalyst layers also comprise other non-catalytic components in addition to the catalyst material, usually polymeric materials which acts as binders to hold the electrode layer together and also performs the additional function of balancing the optimal hydrophobic or hydrophilic nature of the final structure.

These catalyst layers are usually formed into suitable mixtures of the components and deposited into a suitable porous substrate, for example conducting carbon materials such as semi graphitized papers, cloths or foams, or particularly in the case of alkaline electrolyte systems, metal meshes such as nickel or stainless steel. The primary role of the substrate is to act as a physical support for the catalyst containing layers and to provide an electrically conducting structure. It also enables a mechanically stable electrode to be produced.

In view of the above, an improved means of maintaining or regenerating the repellancy properties of fuel cell electrodes is needed.

SUMMARY OF THE INVENTION

According to the teaching of the invention, the repellancy properties of the electrodes can be maintained and, if partially lost, re-established by additives to the fuel gas or to the air supply. This is possible because the liquid electrolyte which is circulated during operation periods as a means for the heat management and for the water balance in the system can be removed for a shut down of the fuel cell system during non-operating times. A good example is the intermittent operation of an electric vehicle. For instance, 4000 operating hours of driving a car correspond to a driving distance of perhaps 200,000 miles. The intermittent service as a principle greatly prolongs the life time of the alkaline fuel cell, but it makes it also possible to service it and the electrodes in certain time intervals (e.g. 10,000 miles), assuring reliable performance.

A preferred embodiment of the invention is a method of regenerating a porous fuel cell electrode of a fuel cell having degraded performance due to loss of hydrophobic repellancy of electrode materials, the method comprising adding to an anode or cathode gas supply an electrode regenerating substance selected from the group consisting of a least one hydrophobic organic substance in liquid or gaseous form and at least one hydrophobic organic substance diluted in an organic solvent, wherein the addition of the hydrophobic organic substance occurs during operation of the porous fuel cell with circulating liquid electrolyte or while the fuel cell is not in operation. The at least one hydrophobic organic substance may be diluted in a 0.3 to 4.0 mass % solution of crystalline paraffin in an organic solvent having less than 10 carbon atoms. Preferably, the organic solvent is ether. The solution of crystalline paraffin may be a 1 to 2 mass % solution. The organic solvent preferably has a boiling point less than 80° C., as is the case with ether. Preferably, the at least one hydrophobic organic substance is a pure or diluted organic alcohol, ketone, or a mixture thereof, and preferably is selected from the group consisting of isopropanol, isobutanol, acetone and octylalcohol.

In another preferred embodiment, the method further comprises contacting the at least one hydrophobic organic substance with an alkaline air cathode of the fuel cell electrode, thereby regenerating the fuel cell electrode by removing carbonate residues from the alkaline air cathode.

In still another preferred embodiment, the at least one hydrophobic organic substance is present at a concentration of 10 to 40 mass % in a either a hydrophilic or hydrophobic solvent. Preferably, the solvent is water.

In yet another preferred embodiment, the electrode regenerating substance is added within an anode gas supply using at least one member selected from the group consisting of a bubbler, a gas jet and a vaporizer. The anode gas supply may comprise hydrogen from a tank, a reformer or an ammonia cracker. The electrode regenerating substance may be added within a cathode gas supply using at least one member selected from the group consisting of a bubbler, a gas jet and a vaporizer.

In yet another preferred embodiment, the inventive method further comprises shutting down the fuel cell, removing the circulating liquid electrolyte, washing the fuel cell with an aqueous washing solution comprising at least one hydrophobic organic substance at a concentration of 10 to 40 mass % in water, and removing the washing solution by evaporation. The method may further comprise restoring repellency of the electrode by treating the electrode with at least one hydrophobic organic substance diluted in a 0.3 to 4.0 mass % solution of crystalline paraffin in an organic solvent having less than 10 carbon atoms.

DETAILED DESCRIPTION OF THE PREFERRED EMBODIMENTS

In a gas diffusion electrode, the electrolyte must penetrate the pores of the electrode structure to a certain extent to establish the optimum interface between gas and liquid electrolyte, but it should not reach the gas-side of the electrodes. The best equilibrium of the so-called three phase zone (porous current collector-reaction gas-liquid electrolyte) is achieved by adequate wetproofing the porous structure with a polymeric substance as repellancy agent. The polymeric substance serves also as a binder. During operation of the electrodes, the wetproofing material may lose its hydrophobicity for various reasons and the result is a penetration into the pores structure, reducing the interface between liquid and gas, noticed by a loss of performance. By adding small amounts of wetproofing agents to the gases supplied to the electrodes, the original three-phase condition is maintained, or, if it is already partially degenerated, means and methods for its re-establishment are described. The invention provides substances and techniques for such maintenance and regeneration processes.

Fuel Cell electrodes may comprise a catalysed active carbon material treated with one or more polymers as binders and/or surface-tension controlling agents, such hydrophobic binders, including materials like polytetrafluoroethylene, fluorinated ethylene-propylene, paraffins, polyethylene, polypropylene, ethylene-propylene in their combination assuring the proper hydrophobic/hydrophilic balance of the electrode, which assures the optimal ionic and also electric conduction pathways in the electrode. The method of regenerating a porous fuel cell electrode according the invention preferably utilizes crystalline paraffin of linear molecular shape.

Figure 1A:
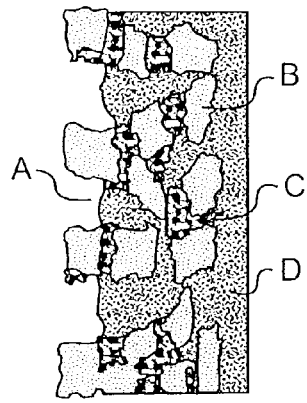
FIG. 1 shows the structure and solid-liquid-gas interface of gas diffusion electrodes.
Figure 1B:
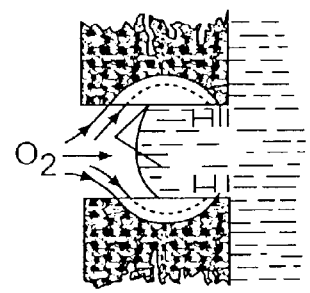

FIG. 1 shows the structure and solid-liquid-gas interface of gas diffusion electrodes. The left drawing shows a section of a two-layer hydrophobic gas diffusion electrode: a) Gas, b) Carbon particles, c) hydrophobic binder (i.e. PTFE), d) Alkaline electrolyte. In the right drawing, the electrolyte is partly filling the pore and the meniscus shows a contact angle larger than 90 degrees (hydrophobic character of the interface).

Figure 2:
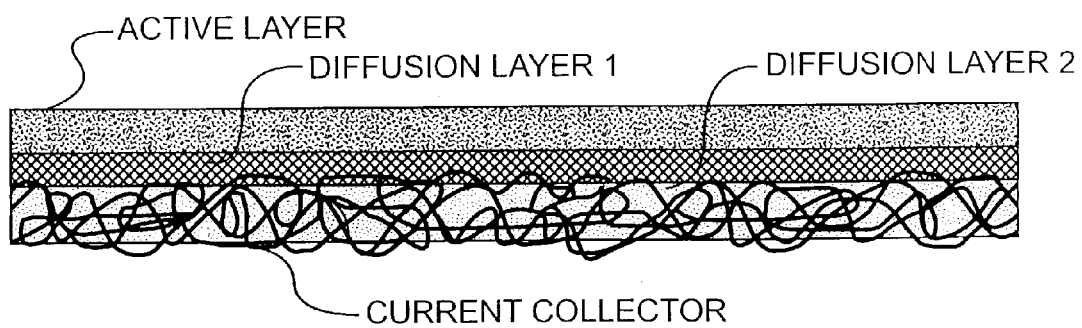
FIG. 2 depicts an example of a complete gas diffusion electrode of modern design.

FIG. 2 shows an example of a complete gas diffusion electrode of modern design. The electrolyte is in contact with the active layer. The gas access is from the current collector side. The claims of the patent application are essentially concerned with the active layer interface (gas-liquid-solid) towards the electrolyte, this zone is partly penetrated by the electrolyte. The Active Layer corresponds to the drawings in FIG. 1, it contains also the catalyst. The Diffusion Layer 1 and Diffusion Layer 2 are conductive porous layers with a step-wise higher content of binder and/or repellency agents to make liquid penetration increasingly difficult. They serve to admit the gas to the active layer and to remove the water vapor in the opposite direction, towards the collector side. The Collector portion, in this example a metal fiber structure, serves to take off the current.

Figure 3:
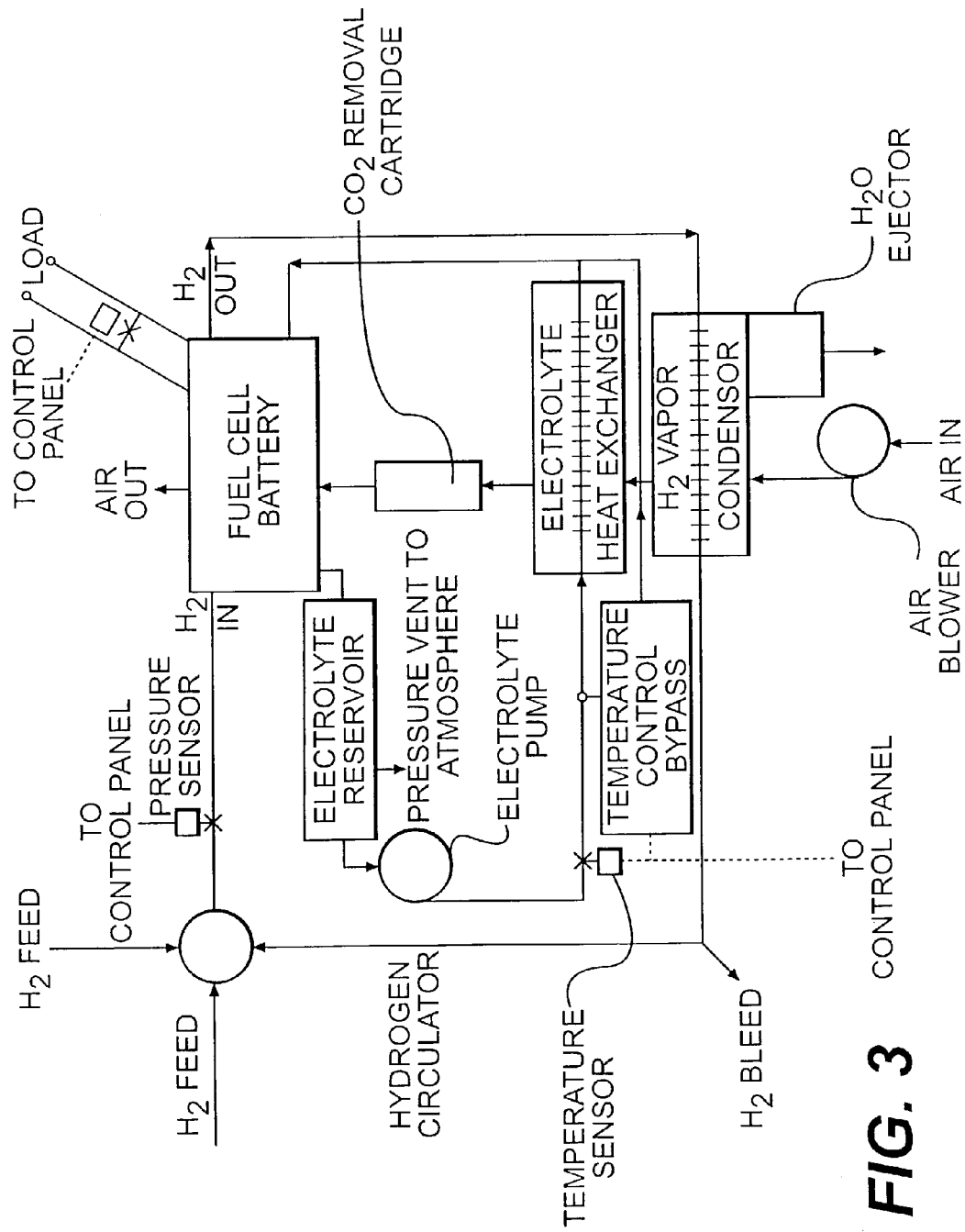
FIG. 3 shows the principle of an alkaline hydrogen-oxygen fuel cell with to circulating and removable electrolyte.

FIG. 3 shows the principle of an alkaline hydrogen-oxygen fuel cell with circulating and removable electrolyte. The $H_2$ and $O_2$ electrodes (in this example tubular porous carbon electrodes; wetproofed with a solution of paraffin) have gas circulation loops driven by gas jet devices, which also allow the addition of trace amounts of surface active agents.

Figure 4:
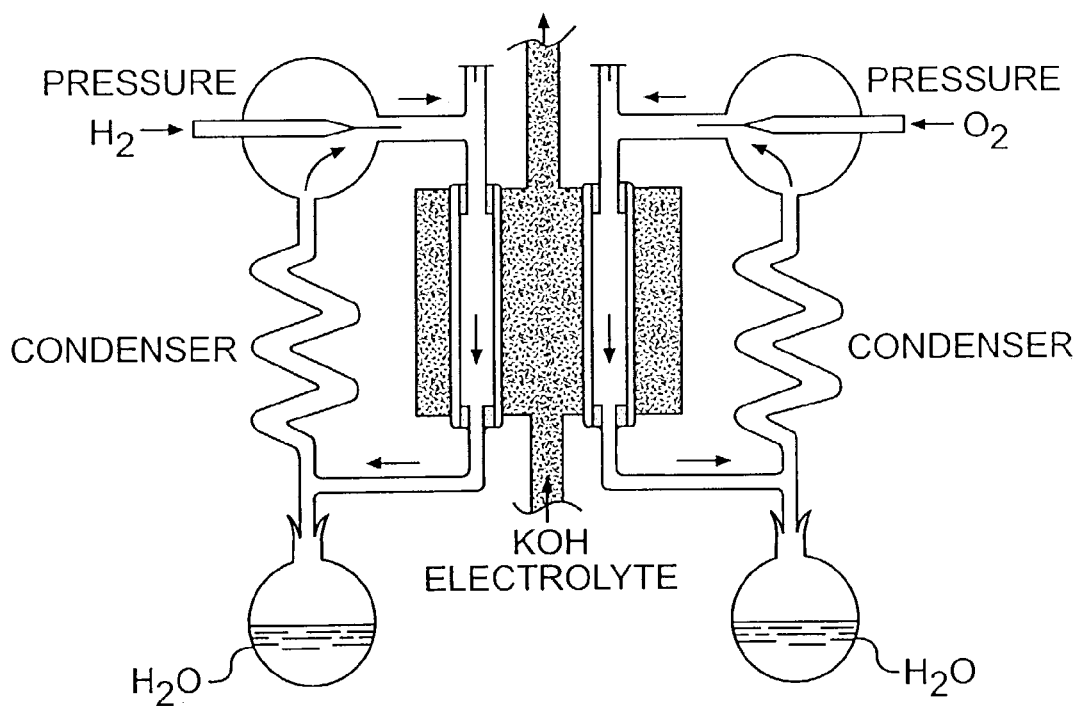
FIG. 4 shows the system of an alkaline fuel cell with circulating electrolyte.

FIG. 4 depicts a flow chart illustrating the system of an alkaline fuel cell with circulating electrolyte. If the KOH pump is switched off, the electrolyte drains into the reservoir below the Fuel Cell Battery. Additives to the hydrogen can be added at the "Feed connection", then circulated with the gas or removed at the bleed outlet. This system does not reuse the air, trace additives to the air stream can be added via the $CO_2$-removal cartridge connection.

Figure 5:
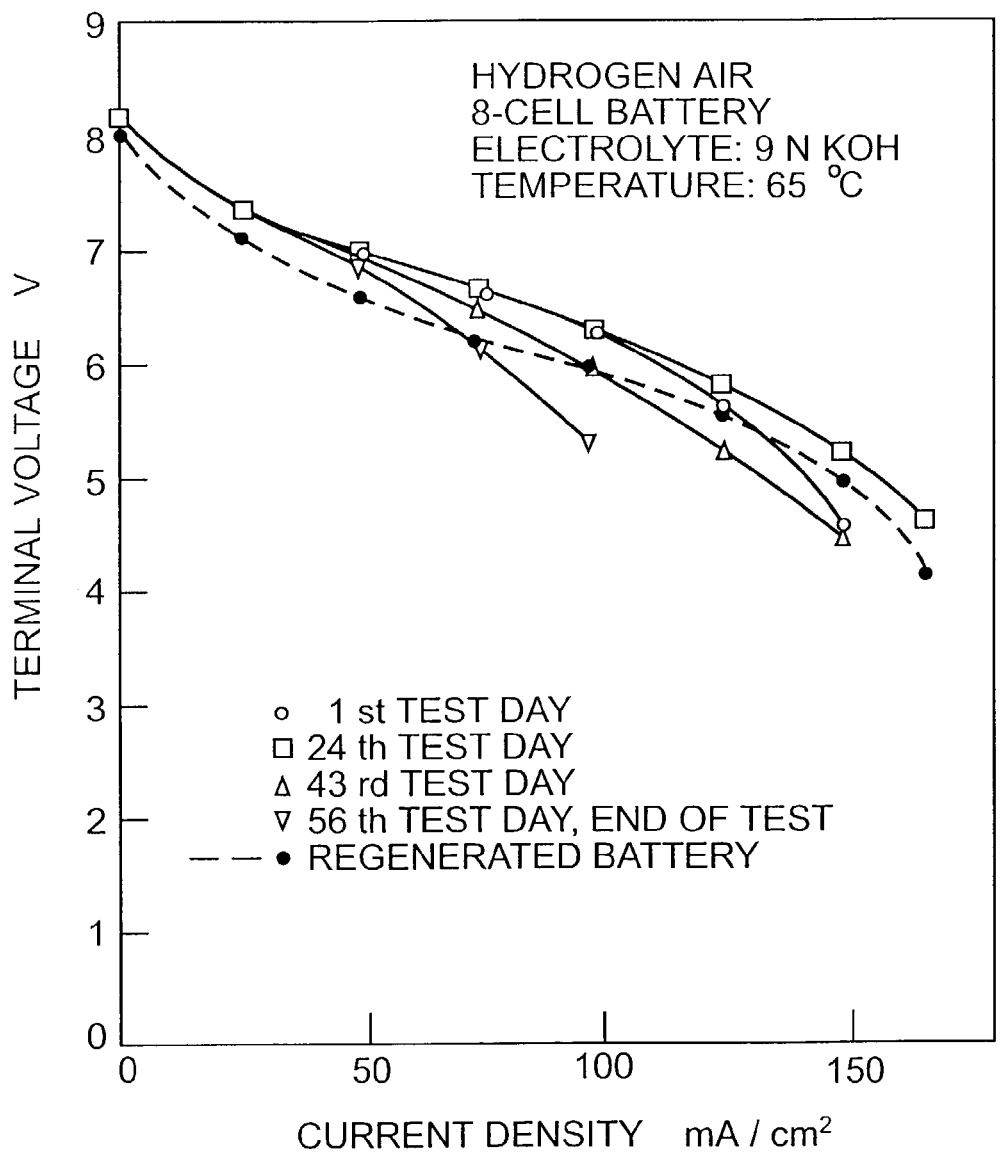
FIG. 5 graphically depicts voltage current curves of an 8 Cell-alkaline hydrogen-air fuel cell stack (according to example 1).

FIG. 5 graphically depicts voltage current curves of an 8 Cell-alkaline Hydrogen-Air Fuel Cell Stack (according to Example 1).

The invention will now be described by way of examples, which are not intended to be limiting the scope of the invention.

EXAMPLE 1

An alkaline hydrogen-oxygen fuel cell stack was built consisting of eight cells. The cell temperature was 65° C., the electrolyte was KOH, concentration 9-N. The stack has been operated continuously at 100 mAcm$^{-2}$ and tested daily. The performance increased from the first day to the 24$^{th}$ day (see FIG. 5), then it declined due to the negative wetting phenomenon. After 54 days the stack was shut down, the electrolyte was removed and the electrodes were regenerated via washing of the electrodes with an aqueous wash solution. The stack was operated for 20 days more without change, then shut down for inspection.

EXAMPLE 2

An alkaline fuel cell was built, whereby a bubbler containing a 2 mass % solution of octylalcohol in water was built within the hydrogen feed of the cell. The cell temperature was 70° C., the electrolyte was KOH, concentration 9N. The cell performance was far more steady than that of a parallel test cell with no octylalcohol addition. The reaction water was distilled out of the gas loops and the electrolyte concentration stayed constant for one month operation at 50 mA/cm$^2$.

While the invention has been described above with respect to certain embodiments thereof, it will be appreciated by one of skill in the art that variations and modifications may be made without departing from the spirit and scope of the invention.

What is claimed is:

1. A method of regenerating a porous fuel cell electrode of a fuel cell having degraded performance due to loss of hydrophobic repellency of electrode materials, the method comprising adding to an anode or cathode gas supply an electrode regenerating substance selected from the group consisting of a least one hydrophobic organic substance in liquid or gaseous form and at least one hydrophobic organic substance diluted in an organic solvent, wherein the addition of the hydrophobic organic substance occurs during operation of the porous fuel cell with circulating liquid electrolyte or while the fuel cell is not in operation, and hydrophobically repelling said electrolyte in said porous fuel cell electrode with said electrode regenerating substance.

2. The method of regenerating a porous fuel cell electrode according to claim 1, wherein the at least one hydrophobic organic substance is diluted in a 0.3 to 4.0 mass % solution of crystalline paraffin in an organic solvent having less than 10 carbon atoms.

3. The method of regenerating a porous fuel cell electrode according to claim 2, wherein the solution of crystalline paraffin is a 1 to 2 mass % solution.

4. The method of regenerating a porous fuel cell electrode according to claim 2, wherein the organic solvent has a boiling point less than 80° C.

5. The method of regenerating a porous fuel cell electrode according to claim 4, wherein the organic solvent is ether.

6. The method of regenerating a porous fuel cell electrode according to claim 3, wherein the at least one hydrophobic organic substance is a pure or diluted organic alcohol, ketone or a mixture thereof.

7. The method of regenerating a porous fuel cell electrode according to claim 3, wherein the crystalline paraffin is of linear molecular shape.

8. The method of regenerating a porous fuel cell electrode according to claim 7, wherein the at least one the hydrophobic organic substance is selected from the group consisting of isopropanol, isobutanol, acetone and octylalcohol.

9. The method of regenerating a porous fuel cell electrode according to claim 8, further comprising contacting the at least one hydrophobic organic substance with an alkaline air cathode of the fuel cell electrode, thereby regenerating the fuel cell electrode by removing carbonate residues from the alkaline air cathode.

10. The method of regenerating a porous fuel cell electrode according to claim 1, wherein the at least one hydrophobic organic substance is present at a concentration of 10 to 40 mass % in a either a hydrophilic or hydrophobic solvent.

11. The method of regenerating a porous fuel cell electrode according to claim 10, wherein the solvent is water.

12. The method of regenerating a porous fuel cell electrode according to claim 1, wherein the electrode regenerating substance is added within an anode gas supply using at least one member selected from the group consisting of a bubbler, a gas jet and a vaporizer.

13. The method of regenerating a porous fuel cell electrode according to claim 12, wherein the anode gas supply comprises hydrogen from a tank, a reformer or an ammonia cracker.

14. The method of regenerating a porous fuel cell electrode according to claim 1, wherein the electrode regenerating substance is added within a cathode gas supply using at least one member selected from the group consisting of a bubbler, a gas jet and a vaporizer.

15. The method of regenerating a porous fuel cell electrode according to claim 1, wherein, when the addition of the hydrophobic organic substance occurs while the fuel cell is not in operation, the method further comprises, prior to said adding:

shutting down the fuel cell,
removing the circulating liquid electrolyte,
washing the fuel cell with an aqueous washing solution comprising at least one hydrophobic organic substance at a concentration of 10 to 40 mass % in water, and
removing the washing solution by evaporation.

16. The method of regenerating a porous fuel cell electrode according to claim 15, further comprising restoring repellency of the electrode by treating the electrode with at least one hydrophobic organic substance diluted in a 0.3 to 4.0 mass % solution of crystalline paraffin in an organic solvent having less than 10 carbon atoms.

17. The method of regenerating a porous fuel cell electrode according to claim 1, wherein said electrode regenerating substance is configured to limit reduction of a liquid/gas interface in said porous fuel cell electrode.

* * * * *